(12) United States Patent
Burnstad

(10) Patent No.: US 9,772,415 B2
(45) Date of Patent: Sep. 26, 2017

(54) CORRECTING TIME LAPSE SEISMIC DATA FOR OVERBURDEN AND RECORDING EFFECTS

(75) Inventor: Roy M. Burnstad, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 617 days.

(21) Appl. No.: 13/198,853

(22) Filed: Aug. 5, 2011

(65) Prior Publication Data
US 2013/0033961 A1 Feb. 7, 2013

(51) Int. Cl.
*G01V 1/06* (2006.01)
*G01V 1/30* (2006.01)

(52) U.S. Cl.
CPC .................... *G01V 1/308* (2013.01)

(58) Field of Classification Search
USPC ......................................................... 367/47
See application file for complete search history.

(56) References Cited

U.S. PATENT DOCUMENTS

| | | | |
|---|---|---|---|
| 5,515,335 A | 5/1996 | Swan | |
| 5,946,271 A | 8/1999 | Dragoset, Jr. | |
| 6,041,018 A | 3/2000 | Roche | |
| 6,438,069 B1 | 8/2002 | Ross et al. | |
| 6,574,563 B1 | 6/2003 | Nickel | |
| 6,715,551 B2 | 4/2004 | Curtis et al. | |
| 6,801,858 B2 | 10/2004 | Nivlet et al. | |
| 7,230,879 B2 | 6/2007 | Herkenhoff et al. | |
| 7,337,070 B2 | 2/2008 | Lecerf | |
| 2006/0193205 A1* | 8/2006 | Herkenhoff et al. | 367/47 |
| 2009/0122643 A1* | 5/2009 | Guigne et al. | 367/38 |
| 2009/0122645 A1* | 5/2009 | Guigne et al. | 367/56 |
| 2009/0299637 A1* | 12/2009 | Dasgupta | 702/12 |
| 2010/0027376 A1* | 2/2010 | Washbourne et al. | 367/25 |
| 2011/0103187 A1* | 5/2011 | Albertin et al. | 367/73 |

FOREIGN PATENT DOCUMENTS

| | | |
|---|---|---|
| CN | 101299070 A | 11/2008 |
| WO | 2006088729 A2 | 8/2006 |

OTHER PUBLICATIONS

Zadeh et al., "Seismic monitoring of in situ combustion process in a heavy oil field", Journal of Geophysics and Engineering, 2010, pp. 16-29, vol. 7, No. 1, IOP Publishing, United Kingdom.
The International Search Report and Written Opinion for Related PCT Application PCT/US2012/046586, dated Jul. 25, 2013.
Lumley, D., "Time Lapse Seismic Reservoir Monitoring", Geophysics, Jan.-Feb. 2001, p. 50-53, vol. 66, No. 1.

(Continued)

Primary Examiner — James Hulka
(74) Attorney, Agent, or Firm — Bracewell LLP; Constance G. Rhebergen; Christopher L. Drymalla

(57) ABSTRACT

Time lapse or 4D seismic data are corrected for geologic overburden and seismic recording system effects. The data from a survey at one time of interest is processed within a selected frequency band and the reservoir level is normalized by the overburden. The results are used to extract reservoir amplitudes from the data of that same survey. Frequencies where overburden signal-to-noise ratios vary dramatically between time lapse surveys may then be avoided in processing of data from the area of interest.

4 Claims, 11 Drawing Sheets

(56) References Cited

OTHER PUBLICATIONS

Ross, C.P., et al., "Inside the Cross-Equalization Black Box", The Leading Edge, 1996, pp. 1233-1240, vol. 15.
Altan, Suat, et al., "Schiehallion: A 3-D Time-Lapse Processing Case History", SEG 1999 Expanded Abstracts, 1999.
Eastwood, John, et al., "Processing for Robust Time-Lapse Seismic Analysis: Gulf of Mexico example, Lena Field", SEG Expanded Abstracts, 1998, pp. 20-23, vol. 17.
Harris, P.E., et. al., "Time Lapse Processing: A North Sea Case Study", 68th Annual International Meeting, Social Expl. Geophys., 1998, Expanded Abstracts, 1-4.
Rickett, J., et al., "A Cross-Equalization Processing Flow for Off-The-Shelf 4-D Seismic Data", 68th Annual International Meeting, Social Expl. Geophys., 1998, Expanded Abstracts, 16-19.
Li, G., "4D Seismic Monitoring of $CO_2$ Flood in a Thin Fractured Carbonate Reservoir", The Leading Edge, Jul. 2003, pp. 691-695.
Korneev, Valeri, et al., "Seismic Low-Frequency Effects in Monitoring Fluid-Saturated Reservoirs", Geophysics, Mar.-Apr. 2004, pp. 522-532, vol. 69, No. 2.
Chen, Shuang-Quan, et al., "$CO_2$ Injection Induced Dispersion and Attenuation", SEG Expanded Abstracts 29, 2010, pp. 2527-2531.
Meunier, J., et al., "Reservoir Monitoring Using Permanent Sources and Vertical Receiver Antennae: The Cere-la Ronde Case Study", The Leading Edge, Jun. 2001, pp. 622-629.
Jan. 27, 2016 Office Action as issued in corresponding Chinese Patent Office with English translation summary.

\* cited by examiner

CORRECTING TIME LAPSE SEISMIC DATA FOR OVERBURDEN AND RECORDING EFFECTS

BACKGROUND OF THE INVENTION

1. Field of the Invention

The present to geophysical exploration, and more particularly to processing of time lapse or 4D seismic data for evaluation of features of interest regarding subsurface formations and their contents.

2. Description of the Related Art

Seismic reflectivity, also known as seismic amplitude or reflection strength, is related to differences in acoustic impedance between reservoir rock and overlying strata. Changing reservoir fluids can modify reservoir acoustic impedance which is calculated by multiplying seismic energy travel velocity and rock density. Seismic reflection strength at a reservoir boundary can vary due to fluid changes such as injection of gas or steam, causing changes in either density, velocity or both. Changes in temperature and pressure also influence the reservoir acoustic impedance. Monitoring movement of these dynamic changes between wells is made possible by conducting repeated time lapse seismic surveys. In this way fluid position is tracked over time by differencing the reflection amplitude between two or more surveys at different times. Other seismic attributes can be differenced but reflection strength is the most commonly used. Further descriptions of these types of surveys and data processing are contained, for example, in "Spectral analysis applied to seismic monitoring of thermal recovery", SEG Expanded Abstracts 12, 331-334 (1993), Eastwood et al. (1993); "Processing for robust time-lapse seismic analysis: Gulf of Mexico example, Lena Field", SEG Expanded Abstracts 17, 20-23 (1998), Eastwood et al.; "Time lapse processing: A North Sea case study", 68th Ann. Internat. Mtg., SEG, Expanded Abstracts, 1-4, Harris et al. (1998); "Schiehallion: A 3-D Time-Lapse Processing Case History, SEG 1999 Expanded Abstracts; Altan et al. (1999); and "4D seismic monitoring of CO2 flood in a thin fractured carbonate reservoir", The Leading Edge, July 2003, 691-695, Li (2003).

Reservoir characterization based on seismic observations has required a highly accurate seismic acquisition and processing system. For the specialized case of integrating time lapse seismic surveys with reservoir monitoring, accuracy requirements have become even more crucial since dynamic reservoir changes such as fluid movement or pressure changes are related to subtle differences in seismic observations. See, for example, "Time Lapse Seismic Reservoir Monitoring", Geophysics, Vol. 66, No. 1 (January-February 2001); P. 50-53, Lumley.

Under ideal conditions, differencing two seismic observations has been a straight forward process so long as the resultant value is assumed to only reflect changes at the reservoir level. Since recorded seismic energy propagated through a geologic overburden, and was also subject to the recording response of the acquisition system, two key assumptions have been used to interpret reservoir amplitude change. These were that propagation effects in the geologic overburden remained the same, and that seismic recording systems responded identically during independent monitoring surveys at different times.

Field studies have routinely shown these basic assumptions to be false. One only needs to consider the recording system can never be placed exactly in the same surface position, and that changes in the overburden do in fact occur. For example, near surface seasonal variations such as water table elevation changed the overburden response. Even daily temperature and moisture changes in the first few feet of soil affected repeated seismic observations.

To improve repeatability in recording, systems have been developed that feature permanently cemented sources and detectors, an example of which is described in "Reservoir monitoring using permanent sources and vertical receiver antennae", The Céré-la-Ronde case study, The Leading Edge, June 2001, 622-629, (Meunier et al.). Unfortunately there still existed possible overburden changes, especially in the near surface, that occurred above and below the level of permanently installed recording systems. An example of seismic energy above a buried system was the effect of reflections from the air/surface interface commonly known as "ghost energy."

Changes in overburden propagation response are routinely compensated for during 4D seismic data processing. Although there may be several causes, overburden changes are usually treated as a single effect. This has been done by conditioning the data using processing techniques that forced overburden measurements to be the same between surveys, or to be the same with those recorded in an initial survey. This processing method prior to differencing is commonly referred to as "cross equalization of a monitor survey to the base survey." Once cross equalization of the overburden was applied, corrected reservoir amplitudes were differenced between surveys to observe dynamic changes in the reservoir, such as movement of injected fluids, pressure fronts and temperature fronts. Examples of cross equalization are described in "Inside the cross-equalization black box", The Leading Edge, 15, 1233-1240, (Ross et al., 1938); "A cross-equalization processing flow for off-the-shelf 4-D seismic data", 68th Ann. Internat. Mtg., SEG., Expanded Abstracts, 16-19, (Rickett et al., 1998); and "Seismic Low-Frequency Effects in Monitoring Fluid-Saturated Reservoirs", Geophysics, Vol. 69, No. 2 (March-April 2004); p. 522-532, Korneev et al.

Performed as a frequency dependent process, cross-equalization can be robust if the frequency bandwidth is similar between two surveys. If not, then cross equalized surveys are limited to a common bandwidth between surveys which may lower resolution of the data. Another key assumption is that signal-to-noise ratios at each processed frequency are the same. While this may be the case for certain types of repeatable noise, such as source generated noise, it does not address frequency dependent noise variations between time lapse surveys.

Non-repeatable frequency dependent noise may be caused by seasonal or daily changes in near surface overburden layers. As such, cross-equalization tends to propagate noise present in one survey into other surveys. This effect tends to decrease repeatability outside the cross-equalization design window which makes it more difficult to observe small seismic amplitude changes caused by dynamic fluid, pressure or temperature changes in the reservoir.

Another state-of-the-art 4D data processing normalization technique employs overburden time domain windows to correct the target reservoir. The procedure calculates an average amplitude value from an overburden window that is divided into the average amplitude value of the reservoir window. Since the correction is computed in the time domain, all frequencies contribute to the final correction factor. Similar to cross equalization, deficiencies in this method arise when certain frequency bandwidths are dominated by noise events that vary across time lapse surveys.

SUMMARY OF THE INVENTION

Briefly, the present invention provides a new and improved computer implemented method of correcting time lapse seismic data for overburden and recording variations present in the data, the data being obtained in a succession of seismic surveys over a period of time from an area of interest regarding a subsurface reservoir beneath an overburden. The computer implemented method according to the present invention forms a measure of average amplitude of seismic energy at the reservoir in a trace in the data of a selected one of the time lapse surveys, and forms a measure of corrected reservoir amplitude of seismic energy at the reservoir in the trace in the data of the selected one of the time lapse surveys. A correction scalar measure is formed indicating the ratio of the measure of corrected reservoir amplitude to the average amplitude at the reservoir in the trace of the selected one of the time lapse surveys, and the correction scalar applied to the trace of the selected one of the time lapse surveys to form a corrected amplitude seismic trace. A record is then formed of the corrected amplitude seismic trace.

The present invention also provides a new and improved data processing system for correcting time lapse seismic data for overburden and recording variations during the course of acquiring the time lapse seismic data from an area of interest regarding a subsurface reservoir in a succession of seismic surveys over a period of time in the area of interest. The data processing system includes a processor which forms a measure of average amplitude of seismic energy at the reservoir in a trace in the data of a selected one of the time lapse surveys. The processor also forms a measure of corrected reservoir amplitude of seismic energy at the reservoir in the trace in the data of the selected one of the time lapse surveys, and forms a correction scalar measure indicating the ratio of the measure of corrected reservoir amplitude to the average amplitude at the reservoir in the trace of the selected one of the time lapse surveys. The data processing system according to the present invention applies the correction scalar to the trace of the selected one of the time lapse surveys to form a corrected amplitude seismic trace, and forms a record of the corrected amplitude seismic trace.

The present invention further provides a new and improved data storage device having stored in a computer readable medium computer operable instructions for causing a data processing system comprising at least one processor unit and an output display to correct time lapse seismic data for overburden and recording variations during the course of acquiring the time lapse seismic data from an area of interest regarding a subsurface reservoir in a succession of seismic surveys over a period of time in the area of interest. The instructions stored in the data storage device cause the data processing system to form a measure of average amplitude of seismic energy at the reservoir in a trace in the data of a selected one of the time lapse surveys, and to form a measure of corrected reservoir amplitude of seismic energy at the reservoir in the trace in the data of the selected one of the time lapse surveys. The instructions stored in the data storage device cause the data processing system to also form a correction scalar measure indicating the ratio of the measure of corrected reservoir amplitude to the average amplitude at the reservoir in the trace of the selected one of the time lapse surveys, and apply the correction scalar to the trace of the selected one of the time lapse surveys to form a corrected amplitude seismic trace. The instructions stored in the data storage device according to the present invention also cause the data processing system to form a record of the corrected amplitude seismic trace.

DETAILED DESCRIPTION OF THE PREFERRED EMBODIMENTS

Figure 1:
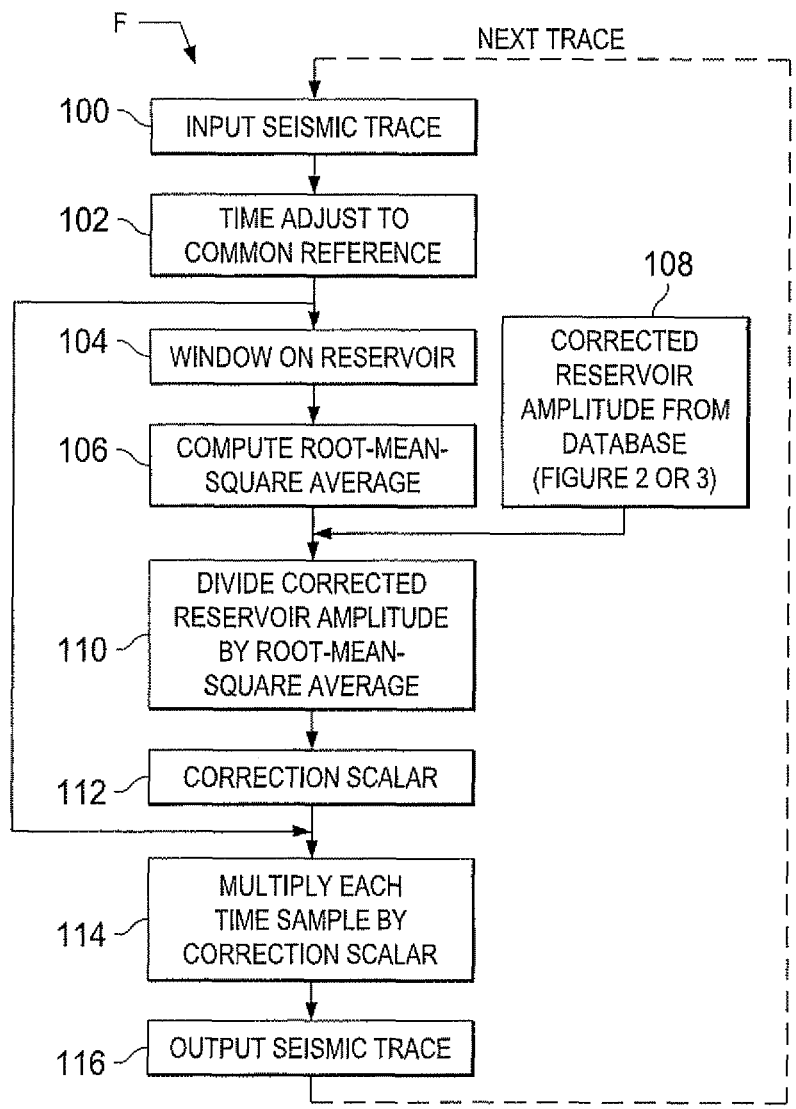
FIG. 1 is a functional block diagram or flow chart of a sequence of correction of time lapse seismic data according to the present invention.

According to the present invention, time lapse or 4D seismic data are corrected for geologic overburden and seismic recording system effects. The method normalizes each time lapse survey within itself rather than across surveys. The data from a survey at one time of interest is processed within a selected frequency band, and the survey data is normalized to corrected reservoir amplitude. As will be set forth, the present invention uses a limited range of frequencies to derive the corrected reservoir amplitude.

The corrected time lapse amplitude results are used to extract reservoir amplitudes from the data of that same survey. Frequencies where overburden signal-to-noise ratios vary dramatically between time lapse surveys may then be avoided in processing of other data from the area of interest.

Processing according to the present invention is performed on pre-stack seismic data. The present invention also does not require a baseline survey. The present invention in addition does not require a cross equalization procedure between time lapse surveys. Further, the present invention does not require a coordinate adjustment procedure.

In the drawings, a flow chart F (FIG. 1) composed of a set of correction steps illustrates the structure of the logic of the present invention as embodied in computer program software. The flow chart F is a high-level logic flowchart which illustrates a method according to the present invention of correcting time lapse seismic data for overburden and recording system effects. Those skilled in the art appreciate that the flow charts illustrate the structures of computer program code elements that function according to the present invention. The invention is practiced in its essential embodiment by computer components that use the program code instructions in a form that instructs a digital data processing system D (FIG. 4) to perform a sequence of processing steps corresponding to those shown in the flow chart F.

The flow chart F of FIG. 1 contains a preferred sequence of steps of a computer implemented method or process for correcting time lapse seismic data for overburden and recording effects according to the present invention is illustrated schematically. The flow chart F uses, as will be set forth, a measure of corrected reservoir amplitude from either a set of transform processing steps T (FIG. 2) or an alternate set of transform processing steps T-1 (FIG. 3), The process of the present invention provides several improvements to the conventional normalization techniques.

Figure 2:
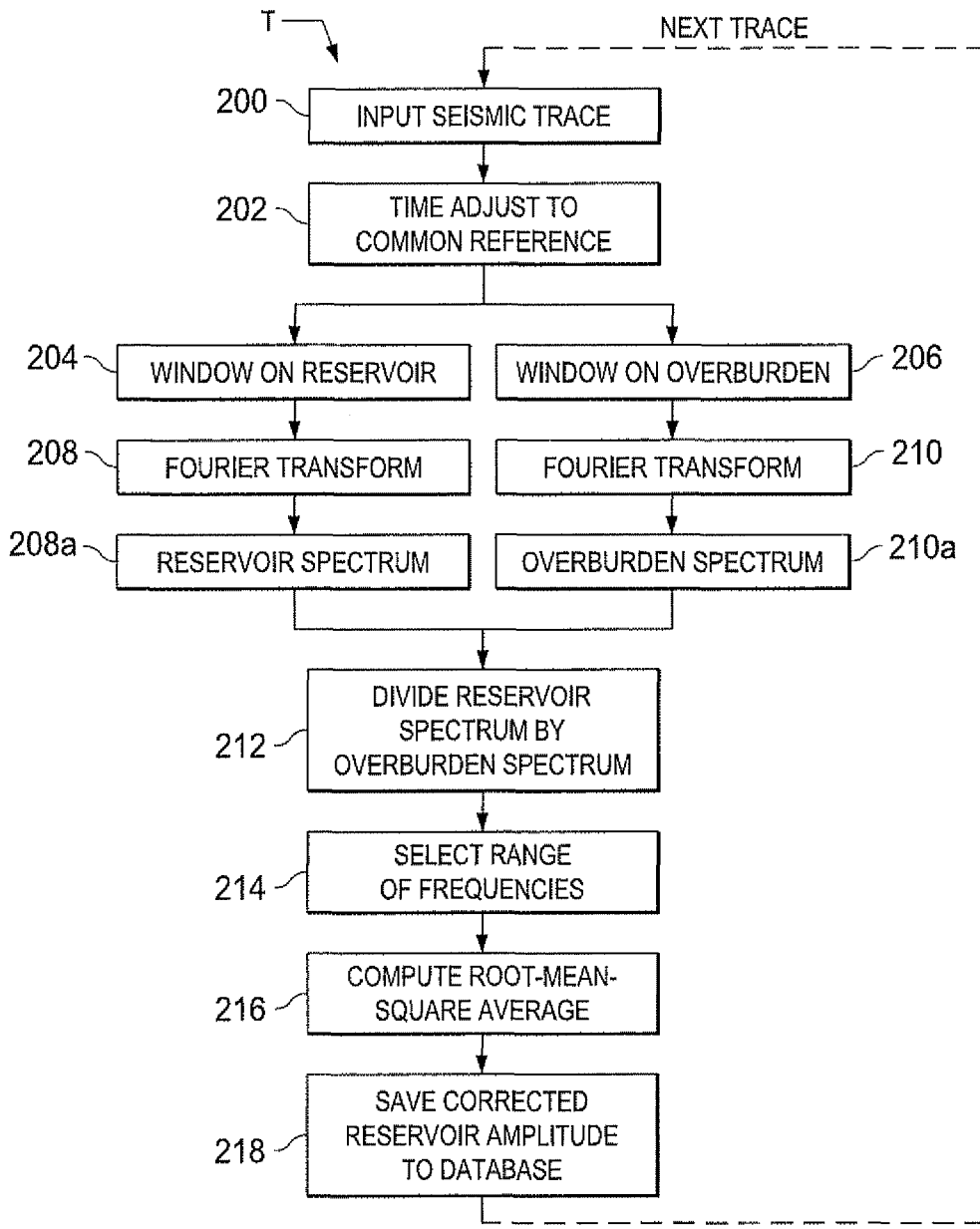
FIG. 2 is a functional block diagram or flow chart of a portion of the sequence of correction of time lapse seismic data of FIG. 1.
Figure 3:
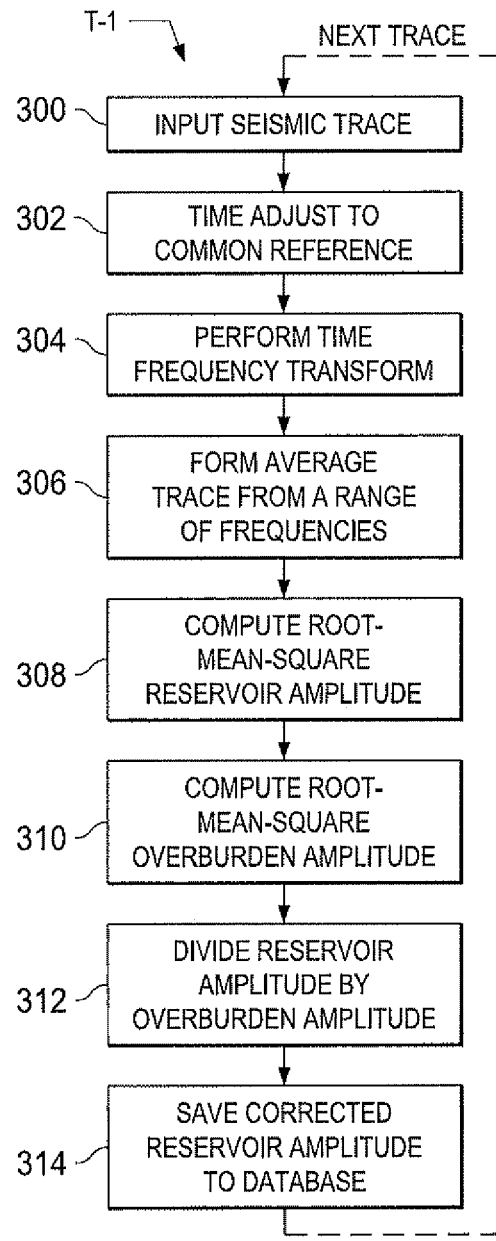
FIG. 3 is a functional block diagram or flow chart of an alternative portion of a sequence of correction of time lapse seismic data of FIG. 1.

The flow chart F is a high-level logic flowchart illustrates a method according to the present invention of correcting time lapse seismic data for overburden and recording effects. The method of the present invention performed in the computer 20 (FIG. 4) of the data processing system D can be implemented utilizing the computer program steps of FIGS. 1, 2 and 3 stored in memory 22 and executable by system processor 24 of computer 20. The input data to processing system D are time lapse or 4D seismic survey data of the conventional type obtained from an area of the earth overlying a subsurface reservoir of interest. As will be set forth, the flow chart F illustrates a preferred embodiment of a computer implemented method or process for correcting time lapse seismic data for overburden and recording effects. As shown in the flow chart F of FIG. 1, a preferred sequence of correction steps based on corrected reservoir amplitude determined in accordance with the present invention, either in the form of transform processing steps T (FIG. 2) or T-1 (FIG. 3).

Figure 5A:
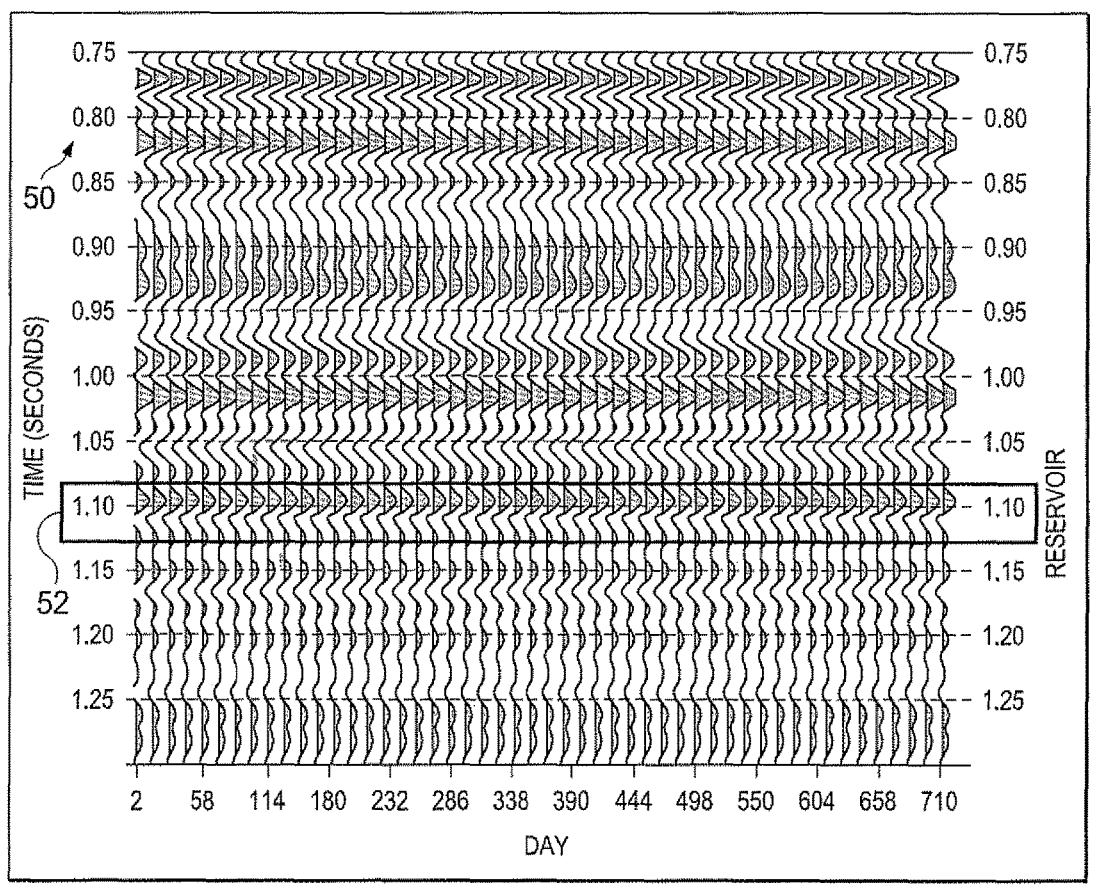
FIG. 5A is a plot of a simulated time lapse seismic survey at a location above a producing hydrocarbon reservoir.

During step 100 (FIG. 1) of the flow chart F, an input seismic trace such as shown at 64 (FIG. 6A) from a simulated time lapse survey of the area of interest regarding a subsurface reservoir beneath an overburden is read from database storage in the data processing system D. FIG. 5A, as well as FIGS. 6A, 7A, 8A, 9A, 10A and 11A, represents a simulated time lapse seismic surveys collected every other or on an alternate day basis over an acquisition time lasting 720 days from an area of interest. During step 102 (FIG. 1), the arrival times of the seismic traces are adjusted to a common arrival time. During step 104, a time window in the time lapse survey data known to be at the time of a target reservoir event in the data is selected. An example target reservoir event is illustrated at a time window 64 in the time lapse survey data of FIG. 6A.

Processing then proceeds to step 106, where an average, or root mean square (RMS), amplitude of the seismic energy amplitude over the time window 64 in the input trace of current interest is determined. The amplitude determined during step 106 represents the uncorrected reservoir amplitude.

During step 108, a measure of corrected reservoir amplitude determined in a manner to be described during the transform processing T (FIG. 2) or T-1 (FIG. 3) is obtained from memory 22 of data processing system D. During step 110 (FIG. 1) the uncorrected reservoir amplitude from step 106 is divided into the corrected reservoir amplitude obtained during step 108 to derive a correction scalar, which is also stored in memory 22 as indicated at step 112. During step 114 the individual time samples in the input seismic trace obtained in step 102 are then multiplied by the correction scalar from step 112.

During step 116, a record is formed of the corrected seismic trace. The record is formed by storing the corrected seismic trace in database memory 22, and an output display may also be formed. Processing returns to step 100 and the sequence shown in FIG. 1 continues on the next input trace from the time lapse survey data. Processing of the input traces over the duration of the time lapse survey of the area of interest continues until all traces in all time lapse surveys are processed.

The computer implemented processing sequence for correction for transform processing T (FIG. 2), begins at step 200 where an input seismic trace such as shown at 64 from one time lapse survey of the area of interest for a reservoir is read from database storage in the data processing system D. The selected seismic trace and the others from the surveys have preferably been pre-processed with conventional relative amplitude processing procedures. The relative amplitude processing is performed to retain as far as possible reflection amplitudes that represent the acoustic impedance of each geologic layer in the overburden and reservoir while attenuating random noise.

Figure 10A:
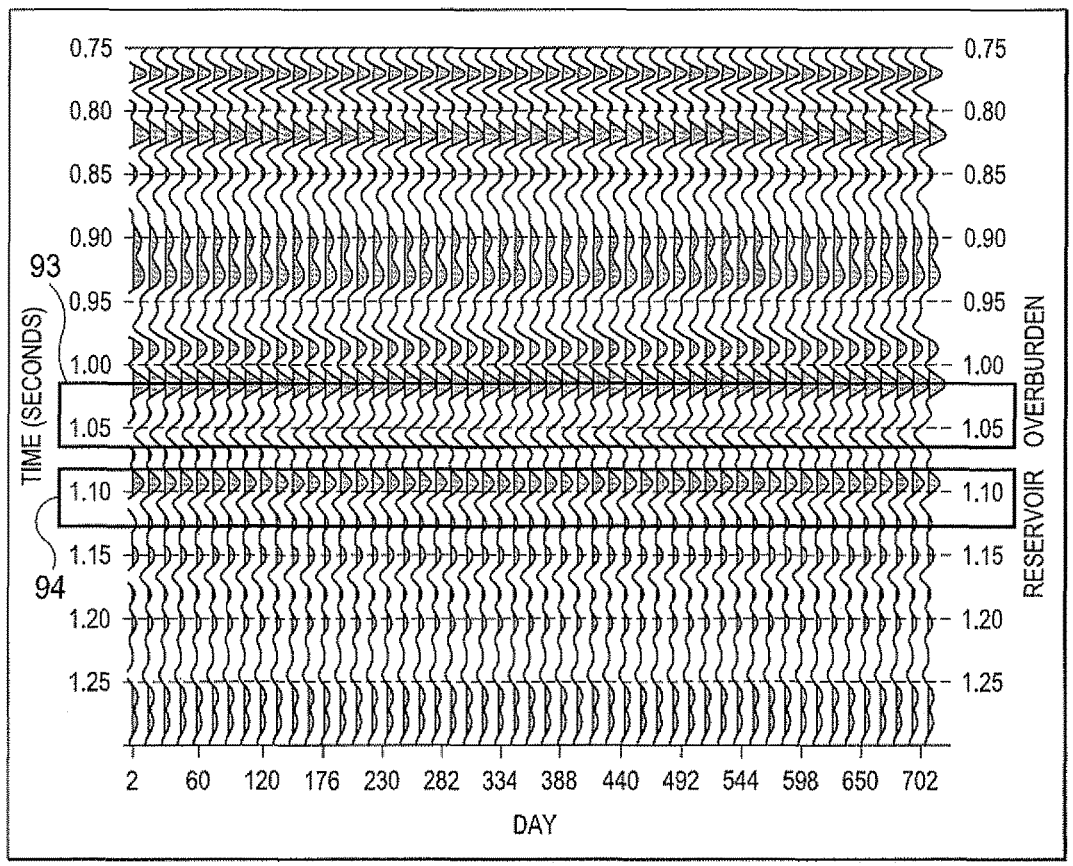
FIG. 10A is a plot of a simulated time lapse seismic survey at the same location above a producing hydrocarbon reservoir as FIG. 6A with seasonal variations in the near surface overburden layer normalized according to conventional time domain normalization techniques.

During step 202 of the transform processing T (FIG. 2), the arrival time of the target reservoir event in the selected seismic trace is adjusted to a common arrival time. Processing then proceeds to two sequences which are preferably performed in parallel, as shown in FIG. 2, to select two time windows from the selected seismic trace. During step 204, a time window such as that shown at 64 known to be at the time of a target reservoir event in the data is selected is selected to represent the target reservoir window. During step 206, a time window such as that shown at 93 (FIG. 10A)

known to be at the time of overburden of earth structure above the target reservoir event in the data is selected to represent the overburden window.

Steps 208 and 210 (FIG. 2) follow steps 204 and 206, respectively. During steps 208 and 210, a Fast Fourier Transform (FFT) processing technique is performed on the data in the respective selected time windows 64 and 93. The output data 208a and 210a from steps 208 and 210 are as indicated in FIG. 2, in the form of a reservoir frequency spectrum and an overburden frequency spectrum. Each of the spectra is now referenced in frequency versus amplitude.

During step 212, the target reservoir amplitude at each frequency of the reservoir frequency spectrum is divided by the overburden amplitude at that same frequency over the same spectrum. During a step 214, a target frequency range in the respective spectra is chosen which is designed to avoid those frequencies contaminated by non-repeatable noise. During step 216, for the target range of frequencies in the respective spectra selected during step 214, a measure of the root mean square (RMS) amplitude for the spectra selected as a result of step 212 is determined. The RMS amplitude determined during step 216 represents the corrected target reservoir amplitude.

During step 218, the corrected reservoir amplitude determined during step 216 is then stored in the seismic database in the data processing system D. During step 218, quality control plots may also be generated of the corrected reservoir amplitude. These plots may be profiles plotted above the seismic traces or maps referenced to recording position and calendar day of the seismic survey. The corrected reservoir amplitude determined and stored for a trace during the transform processing steps T (FIG. 2) is then available as an input corrected reservoir amplitude for that trace during step 108 (FIG. 1). Processing to determine corrected reservoir amplitude for another input trace is then begun by return to step 200 and the sequence shown in FIG. 2 continues on the next input trace from the time lapse survey data. Processing of the input traces over the duration of all time lapse surveys of the area of interest continues until corrected reservoir amplitude for all traces in all time lapse surveys are processed.

FIG. 3 illustrates an alternative set of transform processing steps T-1 which may be used in place of those shown in FIG. 2. In the set of steps T-1, an input seismic trace such as shown at 50 from one time lapse survey of the area of interest is read during step 300 from database storage in the data processing system D. The selected seismic trace and the others from the time lapse survey have preferably also been pre-processed with conventional relative amplitude processing procedures. During step 302, the arrival time of the reservoir event in the selected input seismic trace is adjusted to a common arrival time.

During step 304 a time frequency transform is performed of the data in the selected input trace. The time frequency transform may be any of several conventional types, including, for example, Fast Fourier Transform (FFT); Short Time Fourier Transform (STFT); Wigner-Ville Distribution (WVD) Transform(s); Morlet Wavelet Transform; Complex Wavelet Transform (CWT); and Adaptive Wavelet Transform (AWT). Next, during step 306 an average trace is formed from a range of selected range of frequencies of the transformed data from step 304. The selected target frequency range is preferably one chosen to avoid those frequencies contaminated by non-repeatable noise. During step 308 an average or RMS reservoir amplitude is determined for the average trace data resulting from step 306 at a time known to be at the time of a target reservoir event in the data. During step 310 an average or RMS overburden amplitude is determined for the average trace data resulting from step 306 at a time window known to be at the time window of overburden in the data.

During step 312 the RMS reservoir amplitude determined during step 308 is divided by the RMS overburden amplitude determined during step 310 to form a measure of corrected reservoir amplitude. During step 314, the corrected reservoir amplitude step 312 is then stored in a seismic database in the data processing system D. If desired, quality control plots are generated of the corrected reservoir amplitude. These plots may be profiles plotted above the seismic traces or maps referenced to recording position and calendar day of the seismic survey. The corrected reservoir amplitude is available form database memory for the correction processing sequence of FIG. 1 during step 108. Processing of the input traces over the duration of the time lapse survey of the area of interest continues until corrected reservoir amplitude for all traces in all time lapse surveys are processed.

Figure 4:
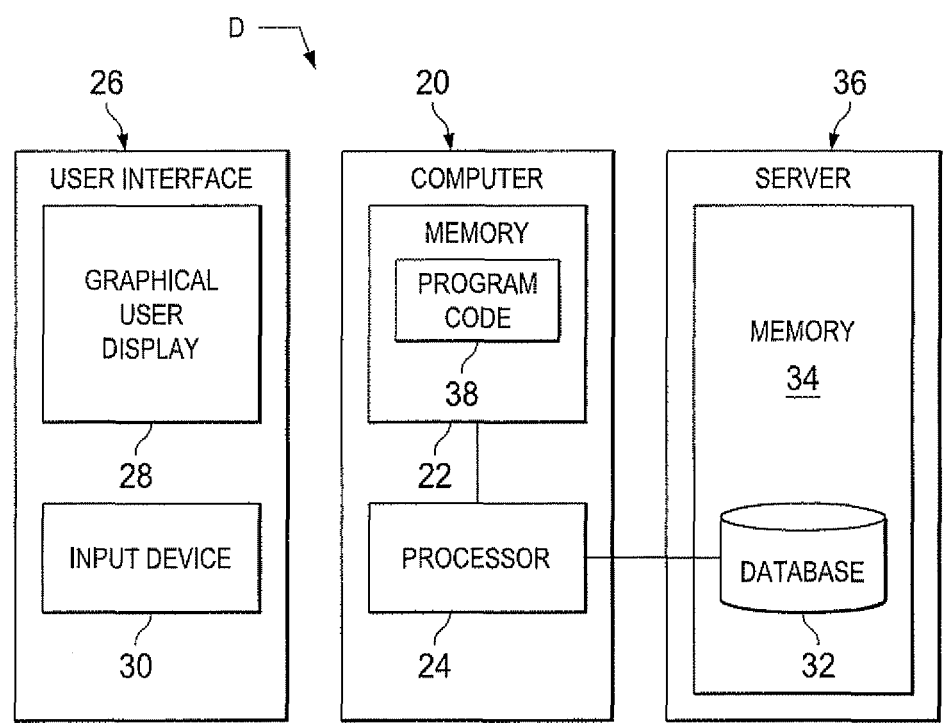
FIG. 4 is a schematic diagram of a computer system for correction of time lapse seismic data according to the present invention.

As illustrated in FIG. 4, a data processing system D according to the present invention includes the computer 20 having processor 22 and memory 24 coupled to the processor 22 to store operating instructions, control information and database records therein. The computer 20 may, if desired, be a portable digital processor, such as a personal computer in the form of a laptop computer, notebook computer or other suitable programmed or programmable digital data processing apparatus, such as a desktop computer. It should also be understood that the computer 20 may be a multicore processor with nodes such as those from Intel Corporation or Advanced Micro Devices (AMD), or a mainframe computer of any conventional type of suitable processing capacity such as those available from International Business Machines (IBM) of Armonk, N.Y. or other source.

The computer 20 has a user interface 26 and an output display 28 for displaying output data or records of processing of seismic data survey measurements performed according to the present invention for correcting time lapse seismic data for overburden and recording system effects. The output display 28 includes components such as a printer and an output display screen capable of providing printed output information or visible displays in the form of graphs, data sheets, graphical images, data plots and the like as output records or images.

The user interface 26 of computer 20 also includes a suitable user input device or input/output control unit 30 to provide a user access to control or access information and database records and operate the computer C. Data processing system D further includes a database 32 stored in computer memory, which may be internal memory 22, or an external, networked, or non-networked memory as indicated at 34 in an associated database server 36.

The data processing system D includes program code 38 stored in memory 22 of the computer C. The program code 38, according to the present invention is in the form of computer operable instructions causing the data processor 20 to correct for time lapse seismic data for overburden and recording effects according to the processing steps illustrated in FIGS. 1 and 2 (or 3) in the manner described above.

It should be noted that program code 38 may be in the form of microcode, programs, routines, or symbolic computer operable languages that provide a specific set of ordered operations that control the functioning of the data processing system D and direct its operation. The instructions of program code 38 may be may be stored in memory 22 of the computer C, or on computer diskette, magnetic tape, conventional hard disk drive, electronic read-only memory, optical storage device, or other appropriate data storage device having a computer usable medium stored thereon. Program code 38 may also be contained on a data storage device such as server 36 as a computer readable medium, as shown.

The method of the present invention performed in the computer 20 can be implemented utilizing the computer program steps of FIG. 4 stored in memory 22 and executable by system processor 24 of computer 20. The input data to processing system D are the input field seismic record and other data including, for example, preprocessed data with relative amplitudes preserved; two way arrival time of the target reservoir; analysis time window length about the target reservoir; and analysis time window length about the overburden section.

Figure 5B:
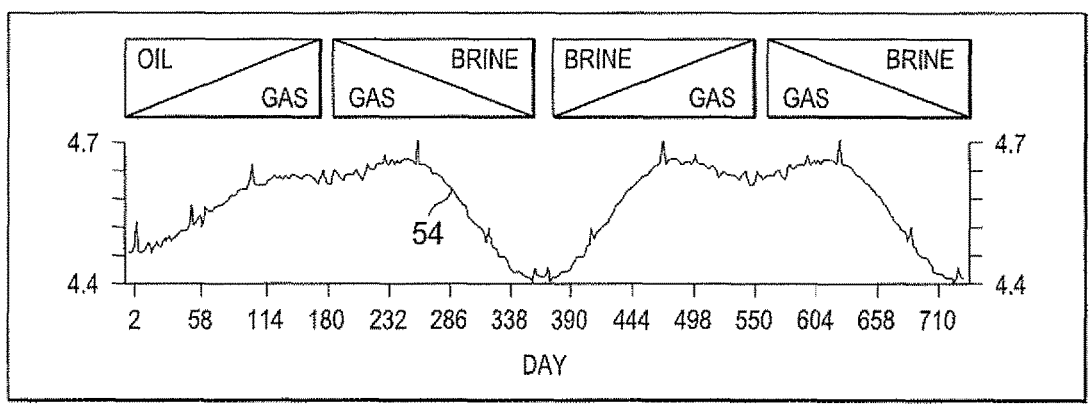
FIG. 5B is a plot of root-mean-square (RMS) amplitude as a function of time obtained from a window in the plot of FIG. 5A.

FIG. 5A illustrates a group of simulated time lapse seismic surveys collected every other day over of an acquisition time of 720 days. FIG. 5B is a plot of reflection strength 54 present over the same time as a result of a target reservoir whose presence is indicated in the seismic survey at window 52. The RMS amplitude 54 from the window 52 around the target reservoir indicates a measurable change (7%) in the reflection amplitude of the target reservoir over the time interval in which the data were plotted.

Figure 6A:
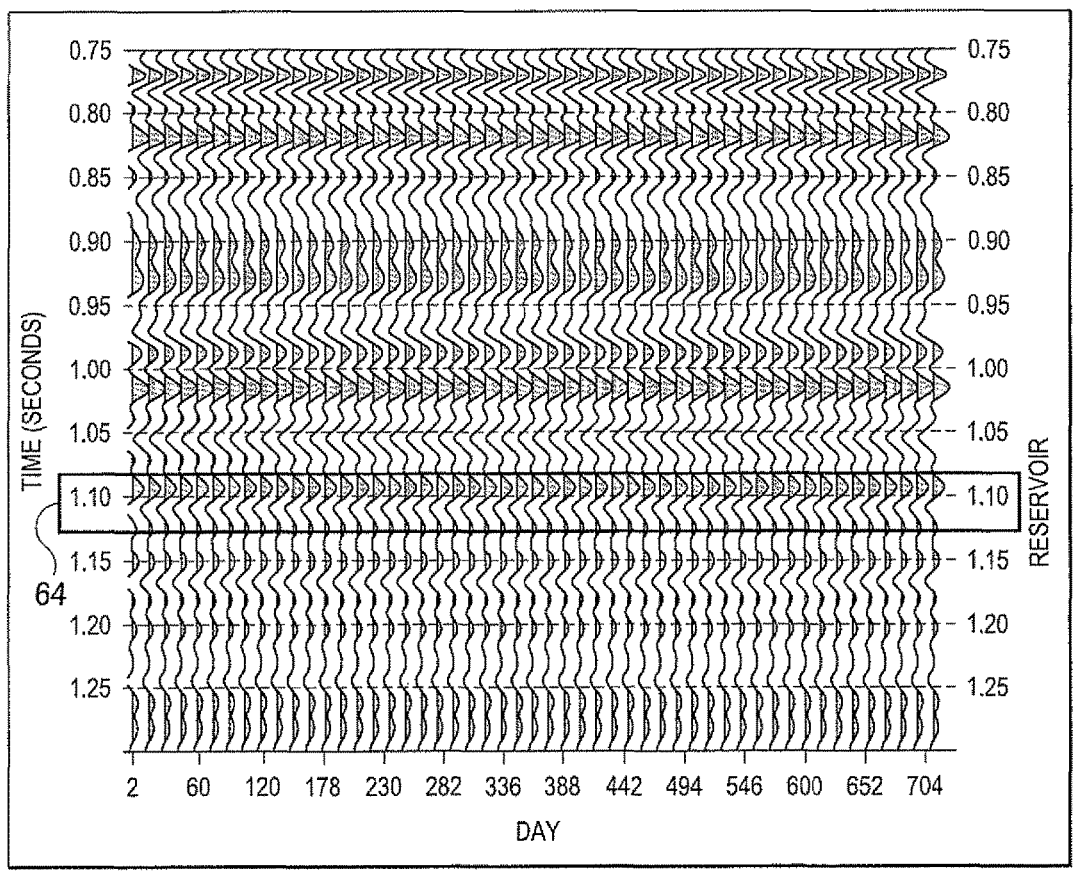
FIG. 6A is a plot of a simulated time lapse seismic survey at the same location above a producing hydrocarbon reservoir as Figure SA with seasonal variations in near surface seismic velocity added.
Figure 6B:
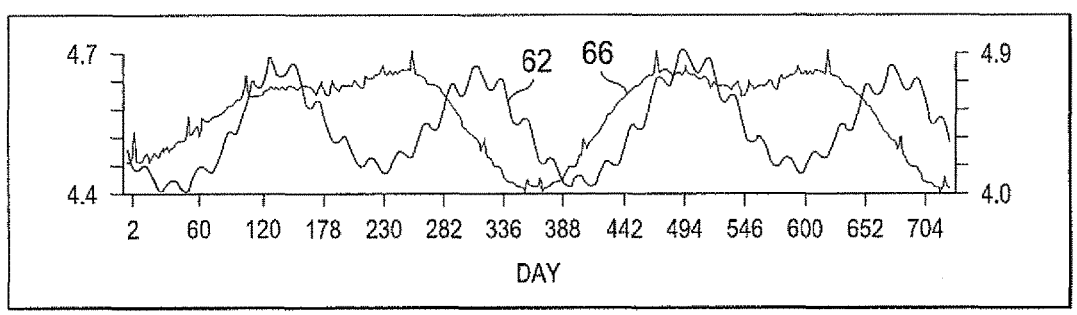
FIG. 6B is a plot of root-mean-square (RMS) amplitude as a function of time obtained from a window in the plot of FIG. 6A.

FIG. 6A illustrates the same time lapse survey data as FIG. 5A, with seasonal variations in the near surface velocity added (+/−5% over the first six meters). A reservoir event 64 has been adjusted to a common arrival time. The RMS amplitude 66 (FIG. 6B) of the reservoir event 52 is plotted above the time lapse survey traces of FIG. 6A. The reservoir amplitude 66 now varies by 25% over time interval in which the data were plotted. It is to be noted that the variations in amplitude do not correspond to those indicated by the expected trend or magnitude plotted at 66 in FIG. 6A.

Figure 7A:
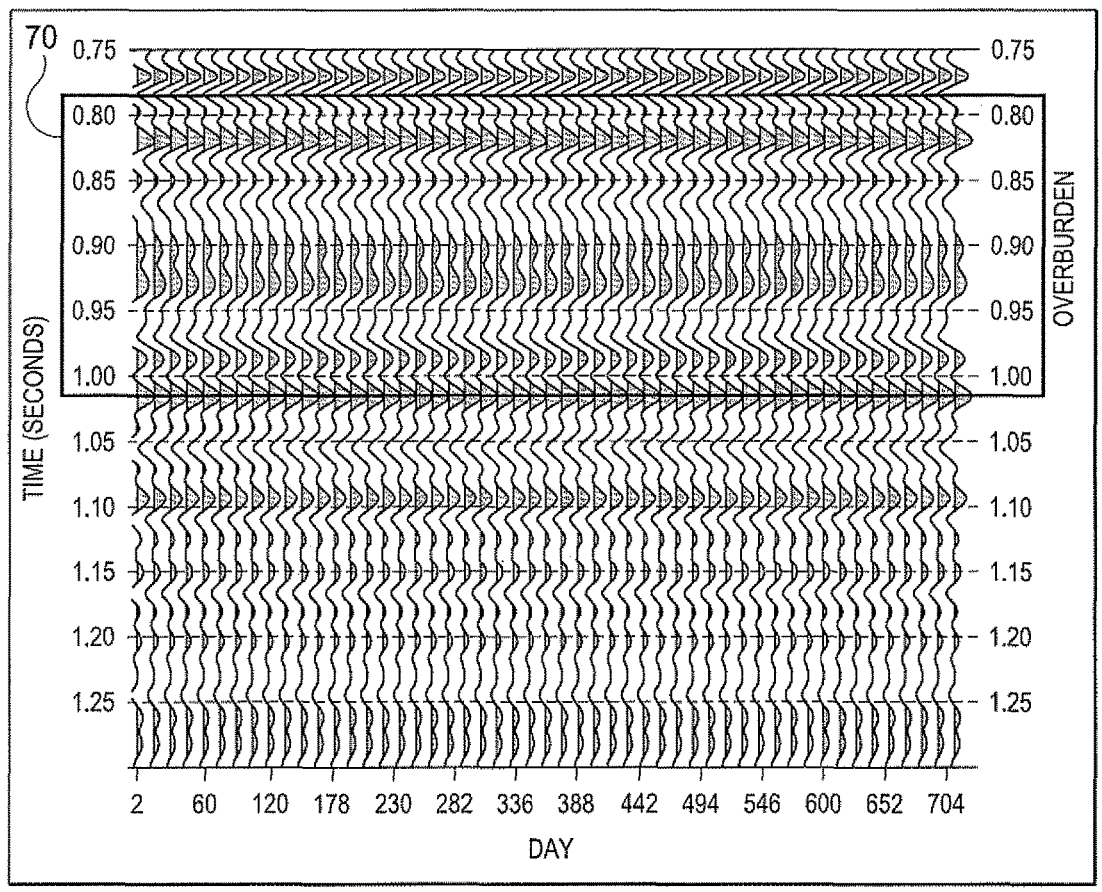
FIG. 7A is a plot of a simulated time lapse seismic survey at the same location above a producing hydrocarbon reservoir as FIG. 5A with seasonal variations in the near surface overburden layer added.
Figure 7B:
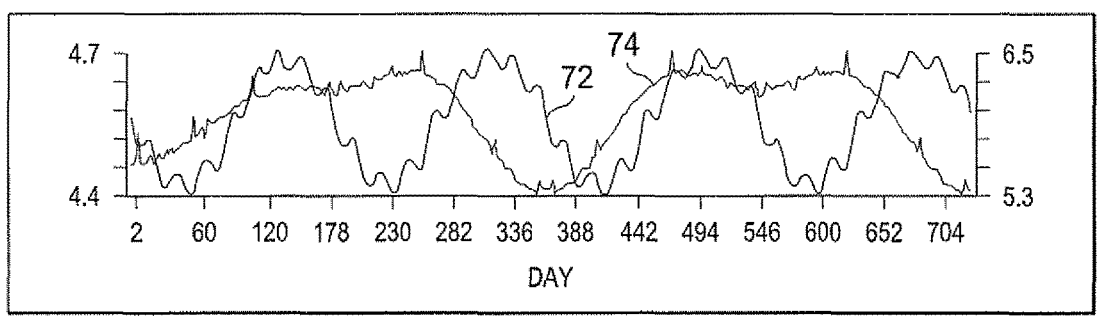
FIG. 7B is a plot of root-mean-square (RMS) amplitude as a function of time obtained from a window in the plot of FIG. 7A.

FIG. 7A illustrates the same time lapse survey data with seasonal variations in the near surface velocity as in FIG. 6A. The RMS amplitude 72 measured from overburden window 70 is plotted in FIG. 7B above the time lapse survey traces of FIG. 7A. Although overburden RMS amplitude should be expected to be constant for each trace in the survey data of FIG. 7A, it should be noted that the determined RMS amplitude 72 varies according to seasonal changes in the near surface velocity. The expected reservoir RMS amplitude is also plotted at 74 in FIG. 7B.

Figure 8A:
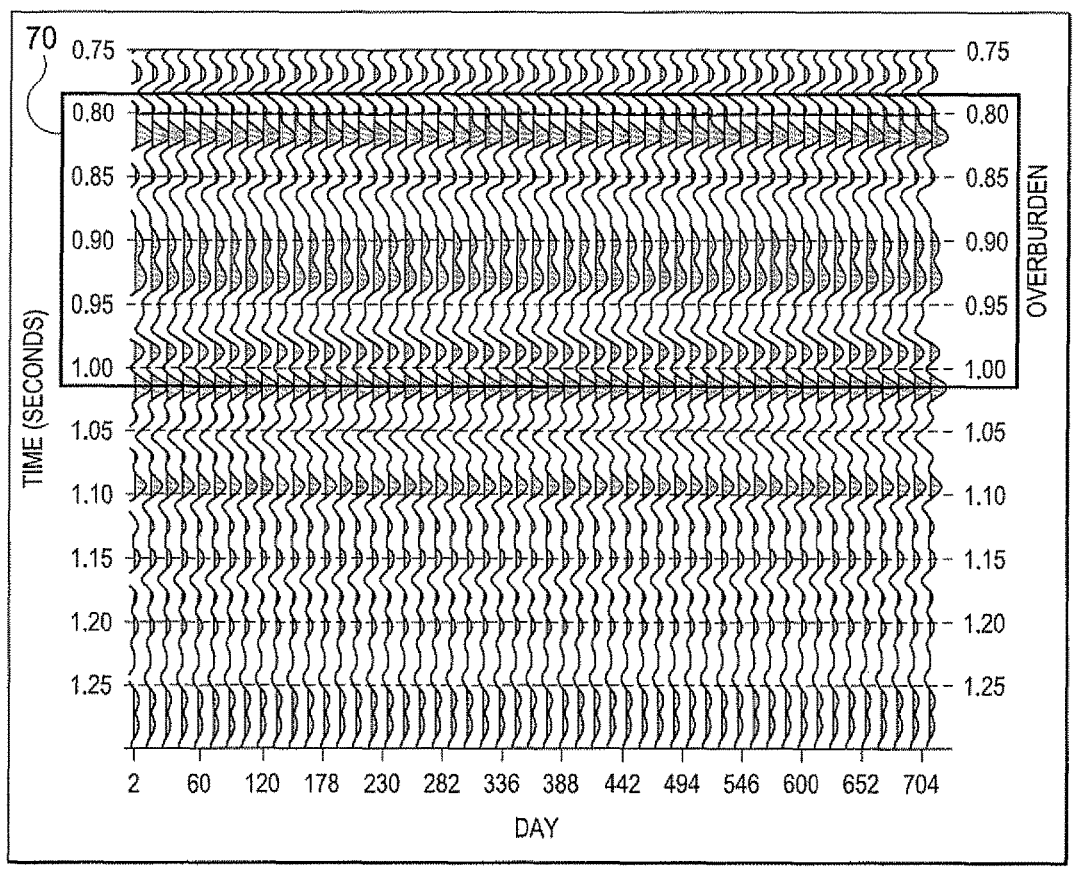
FIG. 8A is a plot of a simulated time lapse seismic survey at the same location above a producing hydrocarbon reservoir as FIG. 5A with seasonal variations in the near surface overburden layer normalized according to conventional cross-equalization techniques.

FIG. 8A illustrates a data plot obtained by conventional industry standard cross-equalization techniques to the time lapse survey data of FIG. 7A. The time lapse surveys of FIG. 8A have been cross-equalized to the starting day of the time lapse survey, using the same overburden window 70 of FIGS. 7A and 8A as a reference. After cross-equalization, a plot 80 from the overburden window is, as would be expected, constant. This response is consistent with the geologic overburden model. The expected reservoir amplitude is also plotted at 82.

Figure 8B:
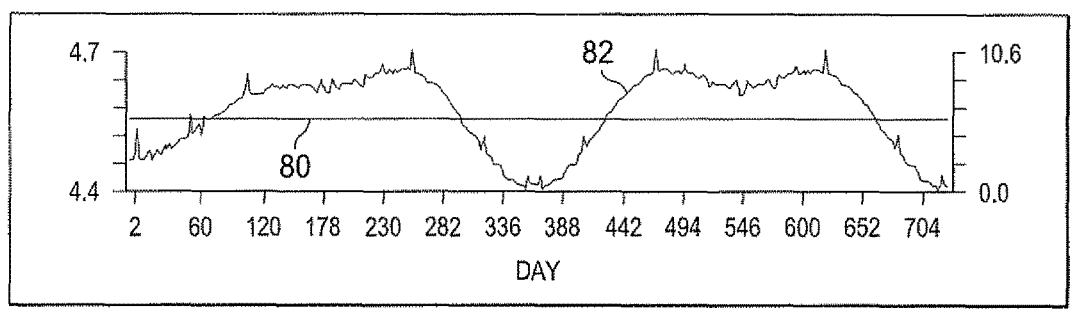
FIG. 8B is a plot of root-mean-square (RMS) amplitude as a function of time obtained from a window in the plot of FIG. 8A.
Figure 9A:
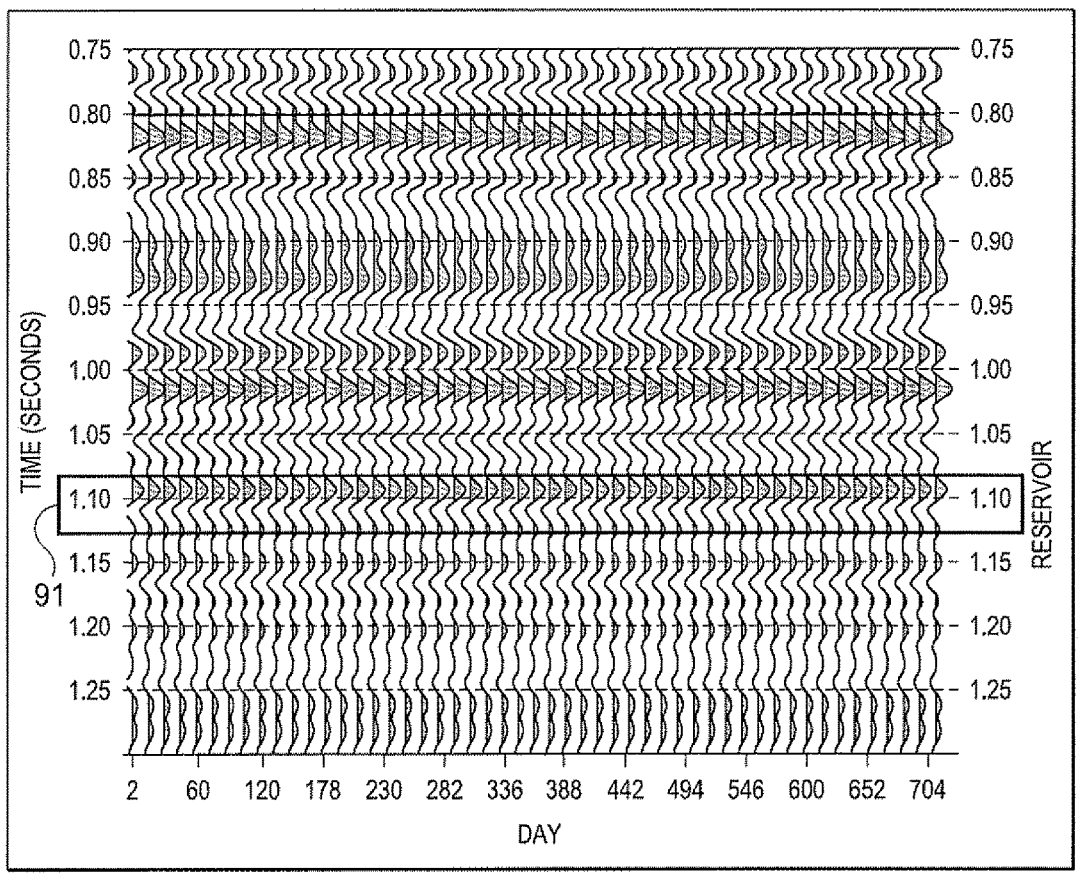
FIG. 9A is a plot of a simulated time lapse seismic survey at the same location above a producing hydrocarbon reservoir as FIG. 8A with seasonal variations in the near surface overburden layer normalized according to conventional cross-equalization techniques.
Figure 9B:
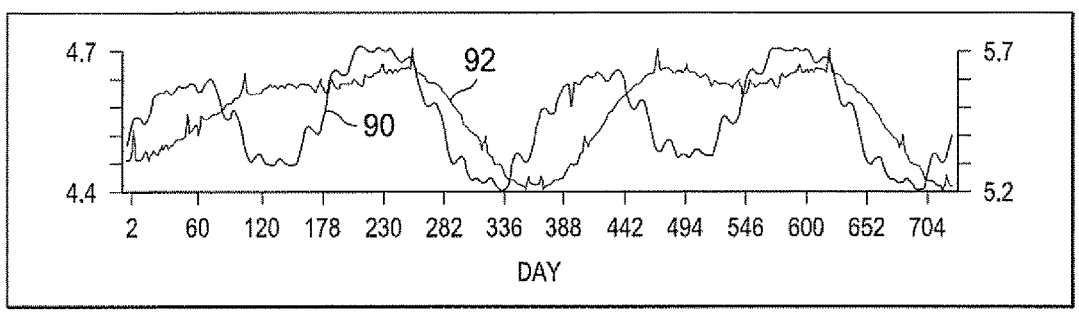
FIG. 9B is a plot of root-mean-square (RMS) amplitude as a function of time obtained from a window in the plot of FIG. 9A.

FIG. 9B contains a plot 90 of reservoir amplitude after application of industry standard cross-equalization techniques to the time lapse survey data of FIG. 7A. The plot is displayed again over the trace data of FIG. 9A. Despite the overburden being successfully cross-equalized as discussed above regarding FIGS. 8A and 8B, near surface variations in the form of large amplitude variations are still present in the data obtained from the reservoir level indicated at 90. The expected reservoir amplitude at reservoir event 91 is also plotted at 92.

Figure 10B:
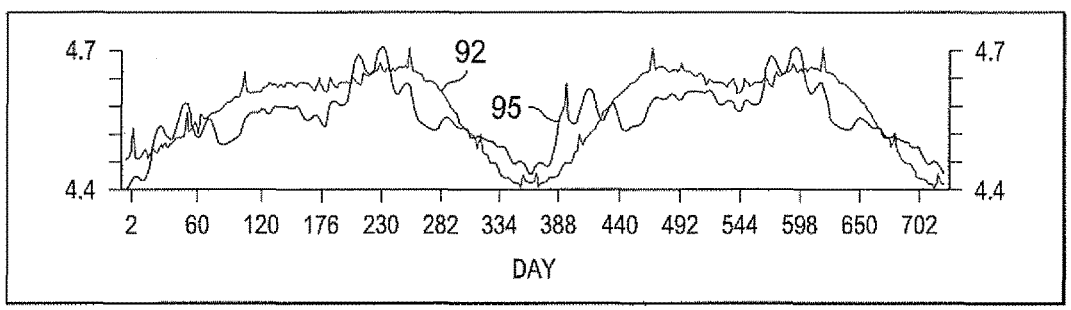
FIG. 10B is a plot of root-mean-square (RMS) amplitude as a function of time obtained from a window in the plot of FIG. 10A.

FIG. 10B begins with a measure of reservoir amplitude from time lapse survey data of FIG. 10A after application of industry standard amplitude normalization techniques. The time lapse surveys with near surface variations are then each normalized on a day to day basis by dividing the RMS reservoir amplitude 94 for that day by RMS amplitude of overburden 93. The resultant RMS amplitude for the reservoir plotted at 95 can be seen to be more accurate than the results obtained from conventional cross equalization of FIG. 9A which are plotted at 90 in FIG. 9B, The RMS reservoir amplitude plotted at 95 can be seen to be more accurate, but large amplitude variations due to near surface velocity changes are still evident. The expected reservoir amplitude is also plotted at 92.

Figure 11A:
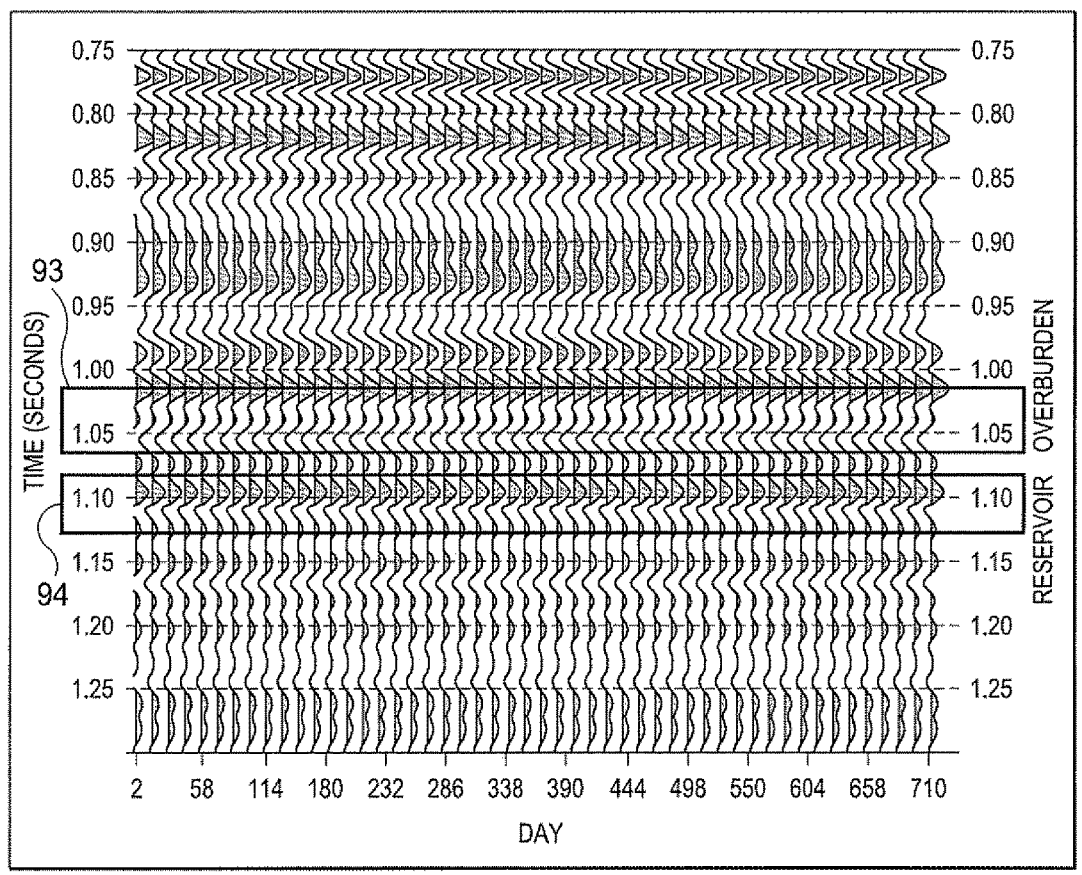
FIG. 11A is a plot of a simulated time lapse seismic survey at the same location above a producing hydrocarbon reservoir as FIG. 6A after processing in accordance with the present invention.
Figure 11B:
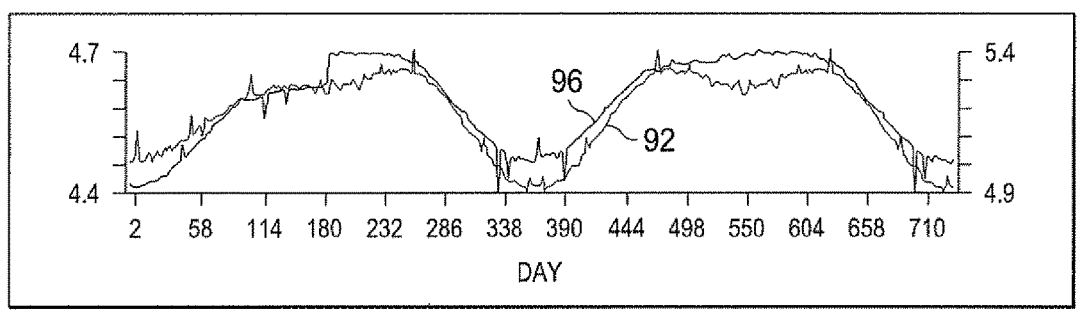
FIG. 11B is a plot of root-mean-square (RMS) amplitude as a function of time obtained from a window in the plot of FIG. 11A.

FIG. 11B contains a plot 96 of RMS reservoir amplitudes according to the present invention on time lapse survey data of FIG. 11A. The RMS reservoir amplitude plotted at 96 can be seen to more closely track expected reservoir response plotted at 97 than the plot 90 obtained from conventional cross equalization (FIG. 9B) and the plot 95 obtained from time domain normalization (FIG. 10B). The processing techniques according to the present invention can thus be used to produce the best match of the expected reservoir response among the three methods. Further, the results of the present invention do not show residual amplitude anomalies caused by variations in the near surface.

It can be thus be seen that using the present invention to select a frequency band within one survey to extract reservoir amplitudes can avoid those frequencies where overburden signal-to-noise ratios vary dramatically between time lapse surveys.

Another advantage of the present invention is that it does not require a surface coordinate adjustment procedure. This affords advantages over conventional procedures comparing two surveys, such as cross equalization, which require additional processing for surface coordinate adjustment. The present invention thus represents a cost savings in project turnaround time and an opportunity to avoid adding processing errors into the data.

Further, as has been noted, using the present invention on model data (FIG. 11B) has shown that dynamic reservoir amplitude changes on the order of 7% can be recovered in the presence of overburden amplitude variations in the range of 25%. The same models show that current-state-of-the-art methods such as cross-equalization and time domain normalization are not successful in determining the correct 7% amplitude change at the reservoir (FIGS. 9B and 10B).

From the foregoing, it can be seen that correcting time lapse seismic data for geologic overburden and seismic recording system effects according to the present invention provides improvements over state-of-the-art normalization techniques. The present invention is especially beneficial to reservoir monitoring observations that employ time lapse seismic surveying. By improving the accuracy of time lapse seismic measurements a positive effect is created for production decisions made by reservoir management, especially during enhanced oil recovery operations. A potential operating cost saving during seismic monitoring may also be available by relaxing the requirement for burying sources and detectors below near surface problem zones.

As has been set forth, the present invention normalizes each time lapse survey within itself rather than across surveys. The present invention uses a limited range of frequencies to derive the corrected reservoir amplitude. The present invention works on pre-stack seismic data. The present invention does not require a baseline survey. The present invention does not require a cross equalization procedure between time lapse surveys. The present invention does not require a coordinate adjustment procedure.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of time lapse seismic surveying performed above a subsurface reservoir to monitor changes in reservoir fluids over time with correction of survey results for variations in geologic overburden above the reservoir and for variations in seismic recording systems of the time lapse seismic surveys, by forming corrected amplitude seismic traces for the survey results, with overburden and recording system variations over time corrected in the time lapse seismic surveys, the method comprising the steps of:
   obtaining a succession of time lapse seismic surveys over a period of time from an area of interest regarding the subsurface reservoir beneath the overburden;
   the time lapse seismic surveys comprising a plurality of seismic traces obtained in the seismic surveys, each seismic trace containing a plurality of time samples obtained during the surveys;
   performing computer implemented processing of the time lapse seismic survey traces to correct for the overburden and recording system variations, the computer implemented processing comprising the steps of:
   forming the corrected amplitude seismic trace for the area of interest by performing the steps of:
      selecting a time sample containing a target reservoir event from a trace of interest of the plurality of seismic traces;
      selecting a time sample containing overburden response from the trace of interest;
      applying a Fourier transform to the selected time sample containing the target reservoir event to form a reservoir spectrum representing target reservoir amplitude as a function of frequency for the trace of interest;
      applying a Fourier transform to the selected time sample containing the overburden response to form an overburden response spectrum representing overburden response amplitude as a function of frequency for the trace of interest;
      forming a ratio of the target reservoir amplitude to the overburden response spectrum as a function of frequency for the trace of interest;
      selecting a range of frequencies in the selected time sample for the trace of interest;
      forming a measure of the corrected target reservoir amplitude for the trace of interest by obtaining an average of the ratio of the target reservoir amplitude to the overburden response spectrum over the selected range of frequencies for the trace of interest;
   repeating the foregoing steps for each of the plurality of seismic traces as a trace of interest; and
   storing as a database of corrected reservoir amplitudes in the computer the measures of the corrected target reservoir amplitude for each of the traces of interest;
   forming a measure of uncorrected average amplitude of seismic energy of a time sample containing a target reservoir event in a trace in a selected one of the time lapse surveys;
   recalling from the database of corrected reservoir amplitudes a corrected target reservoir amplitude of seismic energy in the selected one of the time lapse surveys;
   forming a correction scalar measure indicating the ratio of the corrected reservoir amplitude recalled from the database to the uncorrected average amplitude of the time sample containing the target reservoir event in the trace of the selected one of the time lapse surveys;
   applying the formed correction scalar measure to each of the time samples of the trace of the selected one of the time lapse surveys to form a corrected amplitude seismic trace; and
   storing the corrected amplitude seismic trace in the computer memory; and
   forming an output display of the corrected amplitude seismic traces for the area of interest in the time lapse seismic surveys to monitor changes in reservoir fluids over time with correction for variations in geologic overburden above the reservoir and for variations in seismic recording systems.

2. A method of time lapse seismic surveying performed above a subsurface reservoir to monitor changes in reservoir fluids over time with correction of survey results for variations in geologic overburden above the reservoir and for variations in seismic recording systems of the time lapse seismic surveys, by forming corrected amplitude seismic traces for the survey results, with overburden and recording system variations over time corrected in the time lapse seismic surveys, the method comprising the steps of:
   obtaining a succession of time lapse seismic surveys over a period of time from an area of interest regarding the subsurface reservoir beneath the overburden;
   the time lapse seismic surveys comprising a plurality of seismic traces obtained in the seismic surveys, each seismic trace containing a plurality of time samples obtained during the surveys;
   performing computer implemented processing of the time lapse seismic survey traces to correct for the overburden and recording system variations, the computer implemented processing comprising the steps of:
   forming the corrected amplitude seismic traces for the area of interest by performing the steps of:
      applying a time frequency transform to a selected trace of interest;
      forming a trace having a selected range of frequencies of the selected trace of interest;
      forming a measure of the average amplitude at a time of a target reservoir event in the formed trace having the selected range of frequencies;
      forming a measure of the average amplitude at a time of overburden in the formed trace having the selected range of frequencies;
      forming a measure of the corrected target reservoir amplitude for the selected trace of interest by forming a ratio of the average amplitude at the time of the target reservoir event to the average amplitude at the time of overburden in the trace;

repeating the foregoing steps for each of the plurality of seismic traces as a trace of interest; and storing the measures of corrected target reservoir amplitudes as a database of corrected reservoir amplitudes in the memory of the computer;

forming a measure of uncorrected average amplitude of seismic energy of a time sample containing a target reservoir event in a trace of a selected one of the time lapse surveys;

recalling from the database of corrected reservoir amplitudes a corrected target reservoir amplitude of seismic energy in the selected one of the time lapse surveys;

forming a correction scalar measure indicating the ratio of the corrected reservoir amplitude recalled from the database to the uncorrected average amplitude of the time sample containing the target reservoir event in the trace of the selected one of the time lapse surveys;

applying the formed correction scalar measure to each of the time samples of the trace of the selected one of the time lapse surveys to form a corrected amplitude seismic trace; and storing the corrected amplitude seismic trace in the computer memory; and forming an output display of the corrected amplitude seismic traces for the area of interest in the time lapse seismic surveys to monitor changes in reservoir fluids over time with correction for variations in geologic overburden above the reservoir and for variations in seismic recording system.

3. A method of time lapse seismic surveying performed above a subsurface reservoir to monitor changes in reservoir fluids over time with correction of survey results for variations in geologic overburden above the reservoir, by forming corrected amplitude seismic traces for the survey results, with overburden variations over time corrected in the time lapse seismic surveys, the method comprising the steps of:

obtaining a succession of time lapse seismic surveys over a period of time from an area of interest regarding the subsurface reservoir beneath the overburden;

the time lapse seismic surveys comprising a plurality of seismic traces obtained in the seismic surveys, each seismic trace containing a plurality of time samples obtained during the surveys;

performing computer implemented processing of the time lapse seismic survey traces to correct for the overburden variations, the computer implemented processing comprising the steps of:

forming the corrected amplitude seismic traces for the area of interest by performing the steps of:

selecting a time sample containing a target reservoir event from a trace of interest of the plurality of seismic traces;

selecting a time sample containing overburden response from the trace of interest;

applying a Fourier transform to the selected time sample containing the target reservoir event to form a reservoir spectrum representing target reservoir amplitude as a function of frequency for the trace of interest;

applying a Fourier transform to the selected time sample containing the overburden response to form an overburden response spectrum representing overburden response amplitude as a function of frequency for the trace of interest;

forming a ratio of the target reservoir amplitude to the overburden response spectrum as a function of frequency for the trace of interest;

selecting a range of frequencies in the selected time sample for the trace of interest;

forming a measure of the corrected target reservoir amplitude for the trace of interest by obtaining an average of the ratio of the target reservoir amplitude to the overburden response spectrum over the selected range of frequencies for the trace of interest;

repeating the foregoing steps for each of the plurality of seismic traces as a trace of interest; and storing as a database of corrected reservoir amplitudes in the computer the measures of the corrected target reservoir amplitude for each of the traces of interest;

forming a measure of uncorrected average amplitude of seismic energy of a time sample containing a target reservoir event in a trace in a selected one of the plurality of time lapse surveys;

recalling from the database of corrected reservoir amplitudes a corrected target reservoir amplitude of seismic energy in the selected one of the plurality of time lapse surveys;

forming a correction scalar measure indicating the ratio of the corrected reservoir amplitude recalled from the database to the uncorrected average amplitude of the time sample containing the target reservoir event in the trace of the selected one of the plurality of time lapse surveys;

applying the formed correction scalar measure to each of the time samples of the trace of the selected one of the plurality of time lapse surveys to form a corrected amplitude seismic trace; and storing the corrected amplitude seismic trace in the computer memory and forming an output display of the corrected amplitude seismic traces for the area of interest to monitor changes in reservoir fluids over time with correction for variations in geologic overburden above the reservoir for characterization of the subsurface reservoir.

4. A method of time lapse seismic surveying performed above a subsurface reservoir to monitor changes in reservoir fluids over time with correction of survey results for variations in geologic overburden above the reservoir, by corrected amplitude seismic traces for the survey results, with overburden variations over time corrected in the time lapse seismic surveys, the method comprising the steps of:

obtaining a succession of time lapse seismic surveys over a period of time from an area of interest regarding the subsurface reservoir beneath the overburden;

the time lapse seismic surveys comprising a plurality of seismic traces obtained in the seismic surveys, each seismic trace containing a plurality of time samples obtained during the surveys;

performing computer implemented processing of the time lapse seismic survey traces to correct for the overburden variations, the computer implemented processing comprising the steps of:

forming the measures of corrected reservoir amplitude for the seismic traces by performing the steps of:

applying a time frequency transform to a selected trace of interest;

forming a trace having a selected range of frequencies of the selected trace of interest;

forming a measure of the average amplitude at a time of a target reservoir event in the formed trace having the selected range of frequencies;

forming a measure of the average amplitude at a time of overburden in the formed trace having the selected range of frequencies;

forming a measure of the corrected target reservoir amplitude for the selected trace of interest by forming a ratio of the average amplitude at the time of the target reservoir event to the average amplitude at the time of overburden in the trace;

repeating the foregoing steps for each of the plurality of seismic traces as a trace of interest; and storing the measures of corrected target reservoir amplitudes as a database of corrected reservoir amplitudes in the memory of the computer;

forming a measure of uncorrected average amplitude of seismic energy of a time sample containing a target reservoir event in a trace of a selected one of the plurality of time lapse surveys;

recalling from the database of corrected reservoir amplitudes a corrected target reservoir amplitude of seismic energy in the selected one of the plurality of time lapse surveys;

forming a correction scalar measure indicating the ratio of the corrected reservoir amplitude recalled from the database to the uncorrected average amplitude of the time sample containing the target reservoir event in the trace of the selected one of the plurality of time lapse surveys;

applying the formed correction scalar measure to each of the time samples of the trace of the selected one of the plurality of time lapse surveys to form a corrected amplitude seismic trace; and storing the corrected amplitude seismic trace in the computer memory; and forming an output display of the corrected amplitude seismic traces for the area of interest to monitor changes in reservoir fluids over time with correction for variations in geologic overburden above the reservoir for characterization of the subsurface reservoir.

* * * * *